United States Patent [19]

Dexter et al.

[11] 3,962,313

[45] June 8, 1976

[54] CYCLOALIPHATIC ALKYLHYDROXYPHENYLALKANOATES

[76] Inventors: Martin Dexter, 416 Cedar Drive, Briarcliff Manor, N.Y. 10510; David H. Steinberg, 2608 Davidson Ave., Bronx, N.Y. 10468

[22] Filed: Dec. 16, 1974

[21] Appl. No.: 533,379

Related U.S. Application Data

[63] Continuation of Ser. No. 422,215, Dec. 6, 1973, abandoned, which is a continuation of Ser. No. 179,155, Sept. 9, 1971, abandoned, which is a continuation-in-part of Ser. No. 648,998, June 26, 1967, Pat. No. 3,657,322, which is a continuation-in-part of Ser. No. 372,083, June 2, 1964, abandoned.

[52] U.S. Cl............ 260/473 S; 260/45.85 B; 260/45.85 P

[51] Int. Cl.² ........................................ C07C 69/75
[58] Field of Search ............................. 260/473 S

[56] References Cited

UNITED STATES PATENTS

| | | | |
|---|---|---|---|
| 3,112,338 | 11/1963 | Smuthy et al. | 260/473 S |
| 3,330,859 | 7/1967 | Dexter et al. | 260/473 S |
| 3,657,322 | 4/1972 | Dexter et al. | 260/473 S |
| R27,004 | 12/1970 | Meier et al. | 260/473 S |

*Primary Examiner*—Paul J. Killos

[57] ABSTRACT

Alkylhydroxyphenylalkanoic acid esters of mono- and polyhydric alicyclic alcohols, prepared by known esterification or transesterification procedures, are stabilizers of organic material subject to oxidative deterioration.

11 Claims, No Drawings

CYCLOALIPHATIC ALKYLHYDROXYPHENYLALKANOATES

CROSS REFERENCE

This is a continuation of application Ser. No. 422,215, filed on Dec. 6, 1973, abandoned, which is a continuation of application Ser. No. 179,155, filed on Sept. 9, 1971, abandoned, which is a continuation-in-part of Ser. No. 648,998, filed June 26, 1967, now U.S. Pat. No. 3,657,322, which is a continuation-in-part of Ser. No. 372,083, filed June 2, 1964, now abandoned.

DETAILED DESCRIPTION

This invention pertains to alkylhydroxyphenylalkanoic acid esters of mon- and polyhydric alicyclic alcohols, and to compositions otherwise subject to oxidative deterioration stabilized by the incorporation therein of such esters.

In particular, the present invention relates 2, alicyclic compounds having from 4 to 12 carbon atoms in the alicyclic ring and consisting of a. from 1 to 6 divalent alkylhydroxyphenylalkanoyloxyalkylene units of the structure:

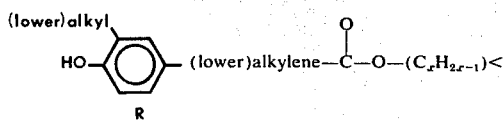

I wherein:

$x$ is 1 or 2, and
R is hydrogen or lower alkyl; and
b. from 0 to 3 divalent aliphatic chains of from 1 to 11 carbon atoms;

both of the free valences of any such divalent aliphatic chain being bound to the same or to separate divalent alkylhydroxyphenylalkanoyloxyalkylene units of the above structure, and each of the free valences of any alkylhydroxyphenylalkanoyloxyalkylene unit, independent of the other free valence of the same unit, being bound either to a separate divalent alkylhydroxyphenylalkanoyloxyalkylene unit of the above structure or to a free valence of a divalent aliphatic chain.

By the term "alkyl" and derivations thereof employing the root "alk," such as "alkylene," or "alkylidene," "alkanoyl" and the like, is intended a group containing a branched or straight chain hydrocarbon chain of from 1 to 20 carbon atoms inclusively. Representative of such alkyl groups are thus methyl, ethyl, propyl, butyl, t-butyl, octyl, decyl, dodecyl, tetradecyl, octadecyl, eicosyl and the like. When the term "alkyl" is herein qualified by the designation "(lower)," there is intended a branched or straight chain hydrocarbon of from 1 to about 6 carbon atoms.

It will be observed in FORMULA I that the alkanoyl portion of these alicyclic esters bears a (lower)alkyl-p-phenolic group. This phenolic group exhibits at least one (lower)alkyl group, in a position ortho to the hydroxy group. A second (lower)alkyl group (R) is optionally present either (a) in the other position ortho to the hydroxy group or (b) meta to the hydroxy group and para to the first (lower)alkyl group. Preferred are the di(lower)alkyl-p-phenolic groups, e.g., R is (lower)alkyl, and although not so limited, the (lower)alkyl groups on the p-phenolic group are preferably branched groups such as t-butyl. Other arrangements, however, such as for example a 3-t-butyl-6-methyl-p-phenolic group or a 3,5-dimethyl-p-phenolic group are included.

It will be appreciated from the foregoing description associated with FORMULA I that the mono- and polyhydric alicyclic alcohols from which the esters of the present invention are derived will contain a fundamental alicyclic ring skeleton of from 4 to 12 carbon atoms, i.e., embrasive of the carbon skeletons of from cyclobutane to cyclododecane. This ring skeleton may be considered as composed of (a) several divalent units of FORMULA I or (b) of (i) one or more such units and (ii) one or more divalent aliphatic chains.

In a first embodiment of this invention, the alicyclic alcohol is monohydric and the novel ester derived therefrom will contain one of the above defined divalent alkylhydroxyphenylalkanoyloxyalkylene units, hereafter "divalent ester unit" and one divalent aliphatic chain of up to 11 carbon atoms, hereafter "divalent aliphatic chain". The divalent aliphatic chain in the case of esters derived from monohydric alcohols will contain at least three carbon atoms, preferably 4 to 5, the two valence bonds being on different, non-adjacent carbon atoms of the chain. Each of the two valence bonds of this divalent aliphatic chain is joined to one of the two bonds of the divalent ester unit, thereby constituting an alicyclic ring having at least 4 carbon atoms in the ring skeleton. Thus, for example, the novel esters derived from the monohydric alcohol cyclopentanol will contain (a) a single divalent ester unit of the defined structure wherein that portion of the structure $—(C_xH_{2x-1})<$ is methylidyne, $x$ thus being 1, and (b) the single divalent aliphatic chain tetramethylene, whereas the ester derived from cyclohexanol will contain the identical divalent ester unit but the divalent aliphatic chain pentamethylene. The novel esters derived from 1,4-dimethylcyclohexan-1-ol, on the other hand, will contain (a) a single divalent ester unit of the defined structure wherein $—(C_xH_{2x-1})<$ is ethylidyne, $x$ thus being 2, and (b) the single divalent aliphatic chain 3-methylpentamethylene. The compounds thus embraced by this first embodiment may be represented by the formula:

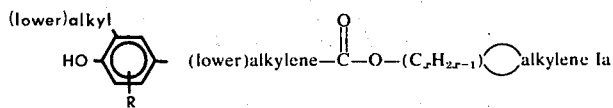

In another aspect of this second embodiment, the polyhydric alicyclic alcohol from which these esters are derived are partially hydroxylated, i.e., some but not all of the ring carbon atoms making up the ring skeleton bear a hydroxy group. The hydroxy groups of such partial hydroxylated alicyclic alcohols may (a) be on adjacent carbon atoms; (b) on nonadjacent carbon atoms or (c) a combination of the foregoing. As an example of the first of these, (a), the alcohols cyclopentane-1,2-diol; cyclohexanol-1,2-diol and cyclooctane-1,2-diol may be mentioned. The esters of the present invention derived from these three alcohols will thus each contain two divalent ester units as previously defined wherein $-(C_rH_{2r-1})<$ in each is methylidyne, one valence bond of one of these units being joined to one valence bond of the other with the remaining valence bond of each of the units being bound to the divalent alicyclic chains trimethylene, tetramethylene and hexamethylene, respectively. Such compounds may thus be represented as follows:

The third class of partially hydroxylated polyhydric alicyclic alcohols is a combination of the first two and may be exemplified by a compound such as cyclohexane-1,2,4-triol. In the ester derived therefrom one of the valences of each of two divalent ester units are joined to one another, the remaining valence on one of these units being joined to a methylene group while the remaining valence on the other of these two units is joined to an ethylene chain. The second valence of the methylene group and that of the ethylene group are joined through the third divalent ester unit.

While the foregoing alcohols can exist in the form of different stereoisomers, e.g., optical isomers and/or geometric isomers, this does not affect the properties of the final esters. Thus either a mixture of such isomers or the separated isomers themselves can be subjected to the procedures herein described without substantially altering the properties of the final esters obtained.

These alkylhydroxyphenylalkanoic acid esters of mono- and polyhydric alicyclic alcohols are stabilizers

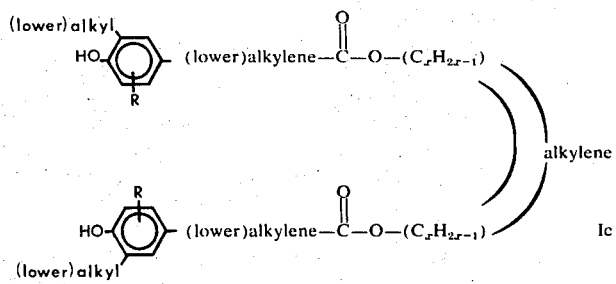

Ic

As examples of the second class, (b), of partially hydroxylated polyhydric alicyclic alcohols, there may be cited 2,2,4,4-tetramethylcyclobutane-1,3-diol; 2,2,4,4,6,6-hexamethylcyclohexane-1,3,5-triol; cyclohexane-1,3-diol; cyclodecane-1,6-diol; and 1,4-di-(hydroxymethyl)cyclohexane. In esters derived from the first four of these, the divalent ester units will have methylidyne as the group $-(C_rH_{2r-1})<$ whereas in the last, this group will be ethylylidene ($-CH_2CH<$). Each of the divalent ester units will be separated by a divalent aliphatic chain. Thus in the case of 2,2,4,4-tetramethylcyclobutane-1,3-diol and 2,2,4,4,6,6-hexamethylcyclohexane, each divalent ester unit is joined to a separate isopropylidene chain. In the case of cyclohexane-1,3-diol each divalent ester unit is joined both to a methylene group and to a trimethylene chain, while in the case of cyclodecane-1,6-diol, each divalent ester unit is joined to two separate tetramethylene chains. Similarly in the case of 1,4-di(hydroxymethyl)cyclohexane, each divalent ester unit is joined to two separate ethylene chains. Such compounds may be represented by the formula:

of organic material normally subject to oxidative deterioration. Materials which are thus stabilized according to the present invention include synthetic organic polymeric substances such as vinyl resins formed from the polymerization of vinyl halides or from the copolymerization of vinyl halides with unsaturated polymerizable compounds, e.g., vinyl esters, $\alpha,\beta$-unsaturated ketones, $\alpha,\beta$-unsaturated aldehydes and unsaturated hydrocarbons such as butadienes and styrene; poly-$\alpha$-olefins such as polyethylene, polypropylene, polybutylene, polyisoprene and the like, including copolymers of poly-$\alpha$-olefins; polyurethanes such as are prepared from polyols and organic polyisocyanates; polyamides such as polyhexamethylene adipamide; polyesters such as polymethylene terephthalates; polycarbonates; polyacetals; polystyrene; polyethyleneoxide; and copolymers such as those of high impact polystyrene containing copolymers of butadiene and styrene and those formed by the copolymerization of acrylonitrile, butadiene and/or styrene. Other materials stabilized according to the present invention include lubricating oil of the aliphatic ester type, e.g., di-(2-ethylhexyl)-azelate, pentaerythritol tetracaproate and the like; animal

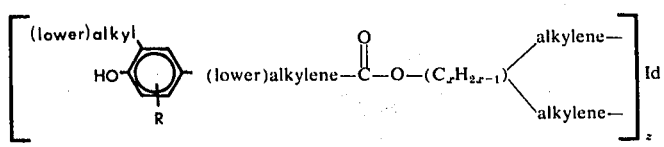

Id wherein z has a value of from 2 to 4.

and vegetable derived oils, e.g., linseed oil, fat, tallow, lard, peanut oil, cod liver oil, castor oil, palm oil, corn oil, cotton seed oil and the like; hydrocarbon material such as gasoline, both natural and synthetic diesel oil, mineral oil, fuel oil, drying oil, cutting fluids, waxes, resins and the like, fatty acids such as soaps and the like.

In general the stabilizers of this invention are employed from about 0.005 to about 10% by weight of the stabilized composition. A particularly advantageous range for polyolefins such as polypropylene is from about 0.1 to about 1 percent.

The compounds of the present invention may be prepared via a number of procedures. In one method the acid of the formula:

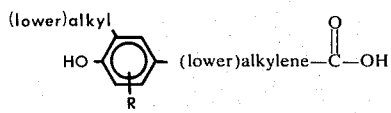

and a mono- or polyhydric alcohol are allowed to react in the presence of an acid catalyst such as p-toluenesulfonic acid. In a second method, the acid chloride of the acid represented by FORMULA II is allowed to react with the mono- or polyhydric alcohol, preferably in a solvent such as pyridine, lutidine or the like. In a third method a lower alkyl ester of the acid of FORMULA II, generally the methyl ester, is transesterified with the mono- or polyhydric alcohol in the presence of a base such as lithium or sodium hydride, sodium methoxide, potassium hydroxide or the like, optionally in the presence of an inert solvent such as dimethylsulfoxide, dioxane, tetrahydrofuran, dimethylformamide or the like. In a fourth method, the silver salt of the acid of FORMULA II is allowed to react with the mono- or polychlorinated analog of the mono- or polyhydric alcohol. Other methods of esterification which are disclosed in the art may be similarly employed. The requisite acids of FORMULA II, their lower alkyl esters and their acid chlorides, as well as their methods of preparation are known. The mono- and polyhydric alcohols are also known and may be prepared via a wide variety of synthetic routes, as described for example in The Chemistry of Carbon Compounds; E. G. Rodd, Ed., Alicyclic Compounds, Vol. IIA, Elsevier, 1953.

Typical of suitable mono- and polyhydric alicyclic alcohols are the following:

cyclobutanol
cyclobutylcarbinol
cyclobutylmethylcarbinol
2,2,4,4-tetramethylcyclobutane-1,3-diol
cyclopentanol
cyclopentane-1,2-diol
3-methylcyclopentane-1,2-diol
1,2-dimethylcyclopentane-1,2-diol
2,3-dimethylcyclopentane-1,2-diol
cyclohexanol
4-methylcyclohexanol
cyclohexane-1,3-diol
cyclohexane-1,4-diol
3-methylcyclohexane-1,2-diol
2,2,5,5-tetramethylcyclohexane-1,3-diol
1,4-di-(hydroxymethyl)cyclohexane
cyclohexane-1,2,3-triol
cyclohexane-1,3,5-triol
2,2,4,4,6,6hexahydrocycloxane-1,3,5-triol
cyclohexane-1,2,3,4,5-pentol
cycloheptane-1,2-diol
cyclononane-1,2-diol
cyclodecane-1,2-diol
cyclodecane-1,6-diol and
cyclododecane-1,2-diol.

The following examples will serve to further typify the nature of the present invention without being a limitation thereof.

EXAMPLE 1

1,3-bis-[3-(3,5-Di-t-butyl-4-hydroxyphenyl)-propionyloxy]-2,2,4,4-tetramethylcyclobutane A mixture of 30.62 g (0.11 moles) of 3-(3,5-di-t-butyl-4-hydroxyphenyl)propionic acid and 0.5 g (2.60 m mole) of p-toluene sulfonic acid monohydrate in 100 ml of xylene is heated with stirring at reflux under distillation conditions until the distillate is no longer turbid. The mixture is cooled, 7.2 g (0.05 mole) of 2,2,4,4-tetramethylcyclobutane-1,3-diol are added and this mixture is heated at reflux with stirring for 5.5 hours, during which time the reaction proceeds to about 95 percent completion (based on water formed as distillate and consumption of the acid starting material).

The reaction mixture is cooled, washed several times with 100 ml portions of water until the washings are neutral and several times with 100 ml portions of 5% aqueous sodium carbonate solution. The basic extracts are combined and extracted four times with 50 ml portions of ether and these ethereal extractions combined with the original xylene solution and washed twice with saturated chloride solution, dried over sodium sulfate and evaporated to yield the product. This is further purified by trituration and recrystallization from ethanol, m.p. 131°–133°C.

Anal: Calc. C, 75.86; H, 9.70; Found C, 75.40; H, 9.49.

1,3-bis-[6-(3,5-Di-t-butyl-4-hydroxyphenyl)phenylhexanoyloxy]-2,2,4,4-tetramethylcyclobutane is obtained in a similar fashion by substituting 6-(3,5-di-t-butyl-4-hydroxyphenyl)hexanoic acid for 3-(3,5-di-t-butyl-4-hydroxyphenyl)propionic acid. Likewise from 3-(3-n-hexyl-4-hydroxy-5-t-butylphenyl)propionic acid there is obtained 1,3-bis-[3-(3-n-hexyl-4-hydroxy-5-t-butylphenyl)propionyloxy]-2,2,4,4-tetramethylcyclobutane.

EXAMPLE 2

1,3,5-tris-[3-(3,5-Di-t-butyl-4-hydroxyphenyl)-propionyloxy]-2,2,4,4,6,6-hexamethylcyclohexane To a stirred cooled solution of 2.16 g (0.010 mole) of 2,2,4,4,6,6-hexamethyl cyclohexane-1,3,5-triol in 50 ml of pyridine is added in several portions over a 20 minute period, 10.69 g (0.036 mole) of 3-(3,5-di-t-butyl-4hydroxyphenyl)propionyl chloride. This mixture is stirred for 30 minutes at 0° to 5°C and then for 15 hours at 45° to 50°C. The mixture is cooled to room temperature and poured into ice water. This mixture is then extracted several times with ethyl ether and these extracts are in turn washed with 2N sulfuric acid, water, 5% aqueous sodium carbonate solution, water and finally saturated sodium chloride solution. The ethereal extracts are then dried over sodium sulfate and evaporated to yield the product. Further purification is achieved by means of chromatography through silica gel, eluting successively with heptane and benzene. Removal of solvent and drying to constant weight at 100°/0.1 mm affords the product, m.p. 105°–115°C.

Anal: Calc. C, 75.86; H, 9.70 Found C, 75.93; H, 9.49.

EXAMPLE 3

1,4-bis-[3,5-Di-t-butyl-4-hydroxyphenyl)-propionyloxymethyl]cyclohexane

To a stirred mixture of 14.42g of 1,4-di-(hydroxymethyl)-cyclohexane and 88.5 mg of lithium hydride in 50 ml of dimethyl sulfoxide are added under nitrogen, 64.33 g of methyl 3-3,5-di-t-butyl-4-hydroxyphenyl)-propionate. This mixture is stirred under vacuum for about 11 hours at 80°–85°C/15-20 mm, during which time methanol is collected as distillate. The remaining solvent is removed by evaporation and the residue is heated for 45 minutes at 110°C/0.1 mm. cooled, an additional 266 mg of lithium hydride are added and this mixture is heated for 5½ hours at 120°C/0.1 mm and then cooled. The residue is warmed with 400 ml of heptane and the resulting solution is filtered. The filtrate is treated with about 3 ml of acetic acid, followed 182°C for 10 minutes, after which time the polypropylene is sheeted and allowed to cool. The sheets are cut into small pieces and pressed for from 5 to 10 minutes on a hydraulic press at 175 lbs/in$^2$ and 218°C. The resultant 25 mil samples are then subjected to accelerated aging in a forced draft oven at 149°C. The results are as follows:

| | Compound | Concentration | Hours to Failure |
|---|---|---|---|
| A. | 1,3-bis-[3-(3,5-di-t-butyl-4-hydroxyphenyl)propionyloxy]-2,2,4,4-tetramethylbutane | 0.1<br>0.25<br>0.5 | 340<br>930<br>1296 |
| B. | 1,3,5-tris-[3-(3,5-di-t-butyl-4-hydroxyphenyl)propionoxy]-2,2,4,4,6,6-hexamethyl-cyclohexane | 0.1<br>0.25<br>0.5 | 67<br>1420<br>956 |
| C. | 1,2-bis-[3-(3,5-di-t-butyl-4-hydroxyphenyl)propionyloxy]-cyclododecane | 0.1<br>0.25<br>0.5 | 660<br>642<br>1413 |
| D. | 1,4-bis-[3-(3,5-di-t-butyl-4-hydroxyphenyl)propionyloxymethyl]cyclohexane | 0.1<br>0.25<br>0.5 | 560<br>1005<br>1480 |
| E. | None | — | 3 |

EXAMPLE 7

Incorporation of 0.5% by weight of dilauryl thiodipropionate and 0.1% of the compounds listed in EXAMPLE 6 in polypropylene in the same manner as therein described, yields the following results:

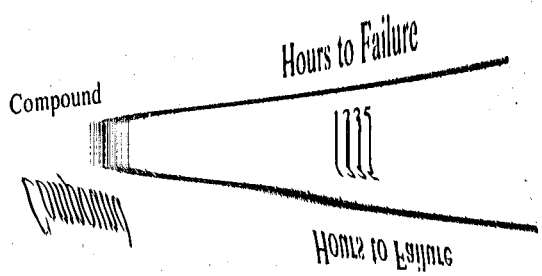

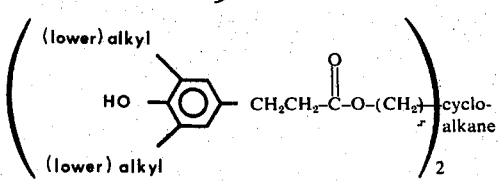

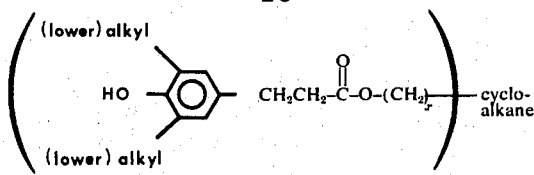

wherein
- $x$ is 0 or 1,
- $y$ has a value from 2 to 4, and
- cycloalkane represents a di- to tetravalent cycloalkyl radical having from 4 to 12 carbon atoms, the two to four valence bonds of said cycloalkyl radical being on adjacent or non-adjacent carbon atoms, provided that when $y$ is 4 the cycloalkyl radical does not have 4 carbon atoms.

8. An ester according to claim 7, wherein each (lower)alkyl group is tert.butyl.

9. An ester according to claim 8, wherein the compound is 1,3-bis-{3-(3,5-di-t-butyl-4-hydroxyphenyl)-proppionyloxy}-2,2,4,4-tetramethylcyclobutane.

10. An ester according to claim 8, wherein the compound is 1,3,5-tris-{3-(3,5-di-t-butyl-4-hydroxyphenyl)propionyloxy}-2,2,4,4,6,6-hexamethylcyclohexane.

11. An ester according to claim 8, wherein the compound is 1,4-bis-{3-(3,5-di-t-butyl-4-hydroxyphenyl)-propionyloxymethyl}-cyclohexane.

* * * * * wherein $x$ is 0 or 1, and cycloalkane represents a divalent cycloalkyl radical having from 4 to 12 carbon atoms, the two valence bonds of said cycloalkyl radical being on adjacent carbon atoms.

5. An ester according to claim 4, wherein each (lower)alkyl group is tert.butyl.

6. An ester according to claim 5, wherein the compound is 1,2-bis-{3-(3,5-di-t-butyl-4-hydroxyphenyl)-proppionyloxy}-cyclododecane.

7. An ester of partially hydroxylated polyhydric alicyclic alcohol, the ester having the formula